United States Patent [19]

Isobe et al.

[11] Patent Number: 4,723,207
[45] Date of Patent: Feb. 2, 1988

[54] MACHINE OPERATOR'S PANEL FOR NUMERICAL CONTROL

[75] Inventors: Shinichi Isobe; Kazuo Sawada, both of Hino, Japan

[73] Assignee: Fanuc Ltd., Minamitsuru, Japan

[21] Appl. No.: 680,257

[22] PCT Filed: Mar. 30, 1984

[86] PCT No.: PCT/JP84/00155
§ 371 Date: Nov. 30, 1984
§ 102(e) Date: Nov. 30, 1984

[87] PCT Pub. No.: WO84/03961
PCT Pub. Date: Oct. 11, 1984

[30] Foreign Application Priority Data

Apr. 1, 1983 [JP] Japan ................. 58-56943

[51] Int. Cl.$^4$ ............ G06F 15/46; G05B 19/405
[52] U.S. Cl. ................... 364/171; 364/188
[58] Field of Search ........... 364/188, 189, 191, 192, 364/171, 474, 475, 167; 340/709, 712, 720, 722

[56] References Cited

U.S. PATENT DOCUMENTS

| | | | |
|---|---|---|---|
| 4,413,314 | 11/1983 | Slater et al. | 364/188 |
| 4,451,895 | 5/1984 | Sliwkowski | 364/188 X |
| 4,479,197 | 10/1984 | Haag et al. | 364/900 |
| 4,490,781 | 12/1984 | Kishi et al. | 364/191 |
| 4,521,860 | 6/1985 | Kanematsu | 364/474 |
| 4,587,608 | 5/1986 | Kishi et al. | 364/191 |
| 4,679,137 | 7/1987 | Lane et al. | 364/188 |

FOREIGN PATENT DOCUMENTS

| | | | |
|---|---|---|---|
| 0076328 | 4/1982 | European Pat. Off. | |
| 0120909 | 4/1984 | European Pat. Off. | 364/189 |

OTHER PUBLICATIONS

Cheng et al., "A General Purpose Micro-Computer Retrofitable Milling Machine Controller", IEEE 1981 IECI Proceedings–Applications of Mini and Microcomputers, San Francisco, Calif., Nov. 1981, 164–167.

*Primary Examiner*—Jerry Smith
*Assistant Examiner*—Clark A. Jablon
*Attorney, Agent, or Firm*—Staas & Halsey

[57] ABSTRACT

Operation information is stored in a memory for numerically controlling a numerical control machine such as a machining tool. This information is displayed on a desired display, and an item of operation information is selected from the operation information displayed, so that the numerical control machine can be controlled in accordance with a predetermined program. Thus, a desired arbitrary item of operation information can be selected using a single machine operator's panel.

2 Claims, 12 Drawing Figures

```
OPERATOR'S PANEL           OOOOO NOOOO

MODE       : MDI ■AUTO EDIT HNDL JOG ZRN
  HANDLE AXIS: ■HX HZ
  HANDLE X10 : ■XI X10
  RAPID OVRD : ■100% FO
  JOG FEED   :  20 MM/MIN
                ▬▬▬▬▬▬▬▬▬▬**********
  FEED OURD. : 100%
                ▬▬▬▬▬▬▬▬▬▬▬*****

ACTUAL POSITION (ABSOLUTE)
       X    0.000           0.000
```

SG1
SG2

(B)

```
OPERATOR'S PANEL           OOOOO NOOOO

BLOCK DELETE : ■OFF ON
  SINGLE BLOCK : ■OFF ON
  MACHINE LOCK :  OFF ■ON
  DRY RUN      : ■OFF ON
  PROTECT KEY  : ■PROTECT RELEASE
  FEED HOLD    : ■OFF ON

ACTUAL POSITION (ABSOLUTE)
       X    0.000      Z   0.000
```

Fig. 2

(A)  `MODE : MDI ■AUTO EDIT HNDL JOG ZRN`

(B)  ```
HANDLE AXIS : ■HX  HZ
HANDLE X10  : ■X1  X10
```

(C)  ```
RAPID OVRD : ■100% FO
JOG FEED   :   20 MM/MIN
           ▬▬▬▬▬▬▬▬▬▬* * * * * * * *
FEED OVRD  :  100%
           ▬▬▬▬▬▬▬▬▬▬▬▬▬* * * *
```

(D)  ```
BLOCK DELETE : ■OFF  ON
SINGLE BLOCK : ■OFF  ON
MACHINE LOCK :  OFF■ON
DRY RUN      : ■OFF  ON
```

(E)  `PROTECT KEY : ■PROTECT RELEASE`

(F)  `FEED HOLD : ■OFF ON`

MACHINE OPERATOR'S PANEL FOR NUMERICAL CONTROL

BACKGROUND OF THE INVENTION

The present invention relates to a machine operator's panel for numerical control, which is used to select and/or input operation information for numerically controlling a machine tool; and, more particularly, to a machine operator's panel for numerical control, which is enabled to select or set a desired display item from the items displayed in said display.

A numerical control system for numerically controlling a machine tool conducts predetermined numerical control processing on the basis of a numerical control program data or the information input via a machine operator's panel (i.e., operation information).

The information input via the operator's panel (i.e., operation information) includes:

(1) Mode Information for designating a run mode such as an edition, a memory run, a tape run, an MDI run, a jog run or a handle feed run;
(2) Single Block—on/off;
(3) Dry Run—on/off;
(4) Block Delete—on/off;
(5) Machine Lock—on/off;
(6) Feed Hold—on/off;
(7) Zero Return—on/off;
(8) Jog Feed Direction;
(9) Jog Feed Speed and Override;
(10) Handle Axis Selection; and
(11) Handle Feed Magnification.

Conventional machine operator's panels are equipped with a number of switches or buttons for inputting operation information.

Specifically, if the switches or buttons are mounted on the machine's operator's panel so that the amount of operation information is increased, the switches or buttons enabling input of increased information (i.e., the larger number of switches or buttons) not only make operation of the panel difficult but also increase the system size and production cost. If the operation information is different for each machine, then the machine design must take into account the differences, and an expensive decorative laminated sheet conforming to the number and shapes of the aforementioned switches or buttons must be prepared. As a result production cost is still further increased.

SUMMARY OF THE INVENTION

It is, therefore an object of the present invention to provide a machine operator's panel for numerical control, which enables selective input of operation information via a single operator's panel independent of the amount of operation information or the kind of the machine to be numerically controlled.

The machine operator's panel according to the present invention comprises a memory for storing operation information for a machine control; a display for displaying the operation information stored in the memory; and selecting means for selecting an arbitrary item of displayed operation information. More specifically, all of the operation information necessary for numerical control is stored in the memory. To input operation information either a portion of the operation information stored is displayed sequentially or all of the same is displayed as an image in the display so that an item or items of the operation information displayed can be selected using the image and the selecting means. On the basis of the input operation information, an arithmetic control unit controls the numerical control machine in accordance with a predetermined control program. As a result, since the operation information can be input using a display, the operator's panel need not be equipped with switches or buttons used to input operation information. Thus, inputting of operation information can be easily conducted regardless of the function and type of the machine to be numerically controlled, merely by changing the display of the operation information to conform to the particular machine function or type. Thus, the design of the operator's panel can be simplified so that it can easily cope with an increased amount of operation information or a change in the information format.

BRIEF DESCRIPTION OF THE DRAWINGS

FIGS. 1A and B are diagrams showing a first embodiment the present invention;

FIGS. 2A-F are diagrams showing a modification of the first embodiment of the present invention;

DESCRIPTION OF THE PREFERRED EMBODIMENTS

Figure 5:
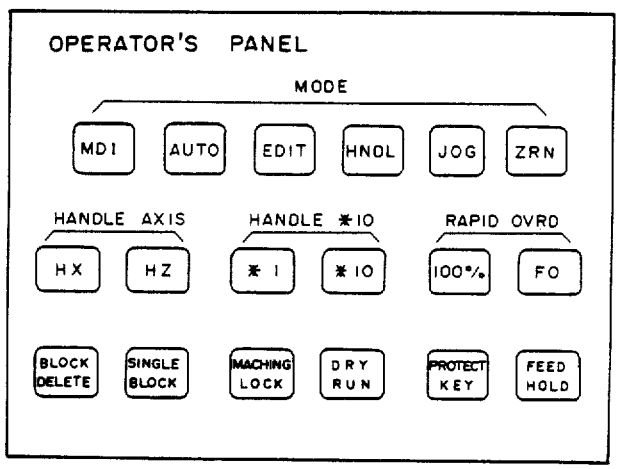
FIG. 5 is diagram showing modified embodiment of the present invention.

The present invention will be described in more detail in the following with reference to the accompanying drawings.

FIG. 1 is a diagram showing an example of the display of operation information for one embodiment of the present invention. In this example, the operation information is displayed via letters. The information is selected by means of either cursor control keys placed in the machine operator's panel or a light pen.

In FIG. 1(A), letters "MODE" indicate a mode information selecting row in which a run mode such as MDI run, an automatic run (AUTO: a tape or memory run), an edition run (EDIT), a handle run (HDI), a jog feed run (JOG) or a zero return run (ZRN) can be selected. In order to select the automatic run (AUTO), for example, both a horizontal and a vertical cursor control key on the machine operator's panel are operated to position a cursor (□) in front of the AUTO, and then the automatic run mode is selected. On the other hand: letters "HANDLE AXIS" indicate a handle feed axis selecting row; "HANDLE *10" indicates a handle feed magnification selecting row; "RAPID OVRD" indicates a rapid override setting row; "FEED OVRD" indicates a feed speed row. Incidentally, the selection of the operation information is conducted in a manner similar to that of mode selection. Specifically, the desired operation information is selected by positioning the cursor in front of an item of a selection display row. On the other hand, selection of the quantity of the selected operation in each row is conducted by operating the horizontal key to extend a bar SG1 or SG2 to the right or left. As the horizontal key is depressed the bar extends or contracts so that the quantity is selected and displayed in accordance with the length of the bar. In FIG. 1(A), the jog feed speed is set at 20 mm/min, and the feed override is set at 100%.

In FIG. 1(B), the letters "BLOCK DELETE" indicate a block delete—on/off row; "SINGLE BLOCK" denote a single block—on/off row; "MACHINE LOCK" indicates a machine lock—on/off row; "DRY RUN" indicates a dry run—on/off row; "PROTECT KEY" is a row for selecting whether or not editing of the memory is permitted; and "FEED HOLD" indicates a feed hold—on/off row. The selection of the operation information (on/off) is conducted by positioning the cursor in front of the "on" or "off". In the example of FIG. 1(B), the following items are set: the block delete—off, the single block—off; the machine lock—on; the protect key—protect; and the feed hold—off.

Incidentally, the foregoing is the case in which all the operation information is inputted by using a single display. As shown in FIGS. 2(A) to (F), however, the operation information may be divided into, for example, groups 1 to 7: a mode selection group (FIG. 2(A)); a handle feed group (FIG. 2(B)); a feed-speed related group (FIG. 2(C)); an automatic-run related group (FIG. 2(D)); a program protect group (FIG. 2(E)); a feed hold group (FIG. 2(F)); and a JOG-feed related group (not shown), of which only a few groups may be inputted from the display frame.

Figure 3:
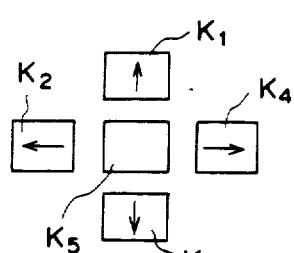
FIG. 3 shows an arrangement of cursor keys of one embodiment of the present invention.
Figure 4:
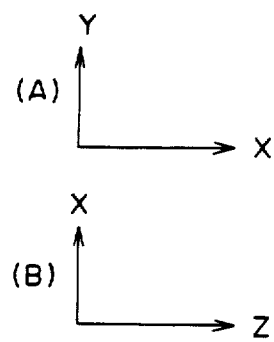
FIGS. 4A and B show a correspondence between the cursor keys and the display axes for the present invention.

FIG. 3 illustrates an arrangement of manual feed keys which are placed on the operator's panel, and also function as cursor control keys. The machine tool or robot can be manually fed in a direction of a predetermined axis by operating keys K1 to K4, and a rapid feed can be effected by simultaneously operating a key K5. Here, the machine tool has either an X axis and a Y axis or an X axis and a Z axis, as the case may be. For example, a milling machine has it coordinates determined, as shown in FIG. 4(A), and a lathe has its coordinates determined, as shown in FIG. 4(B). In dependence upon the type of machine tool used, therefore, the keys may be used for the +X, +Y or the +Z directions. With this in mind, the correspondences between the respective keys and axes can be inputted as operation information in the present invention.

FIG. 5 is a diagram showing a modified embodiment of the present invention, which is different from the embodiment of FIG. 1 in that the operation information is displayed in the form of keys on the display. A transparent conductive film having the forms of the displayed keys is on the display. As a result, operation information can be input by touching the corresponding display keys in the frame of FIG. 5. Incidentially, the operation information displayed has the same meaning as that of FIG. 1.

Figure 6:
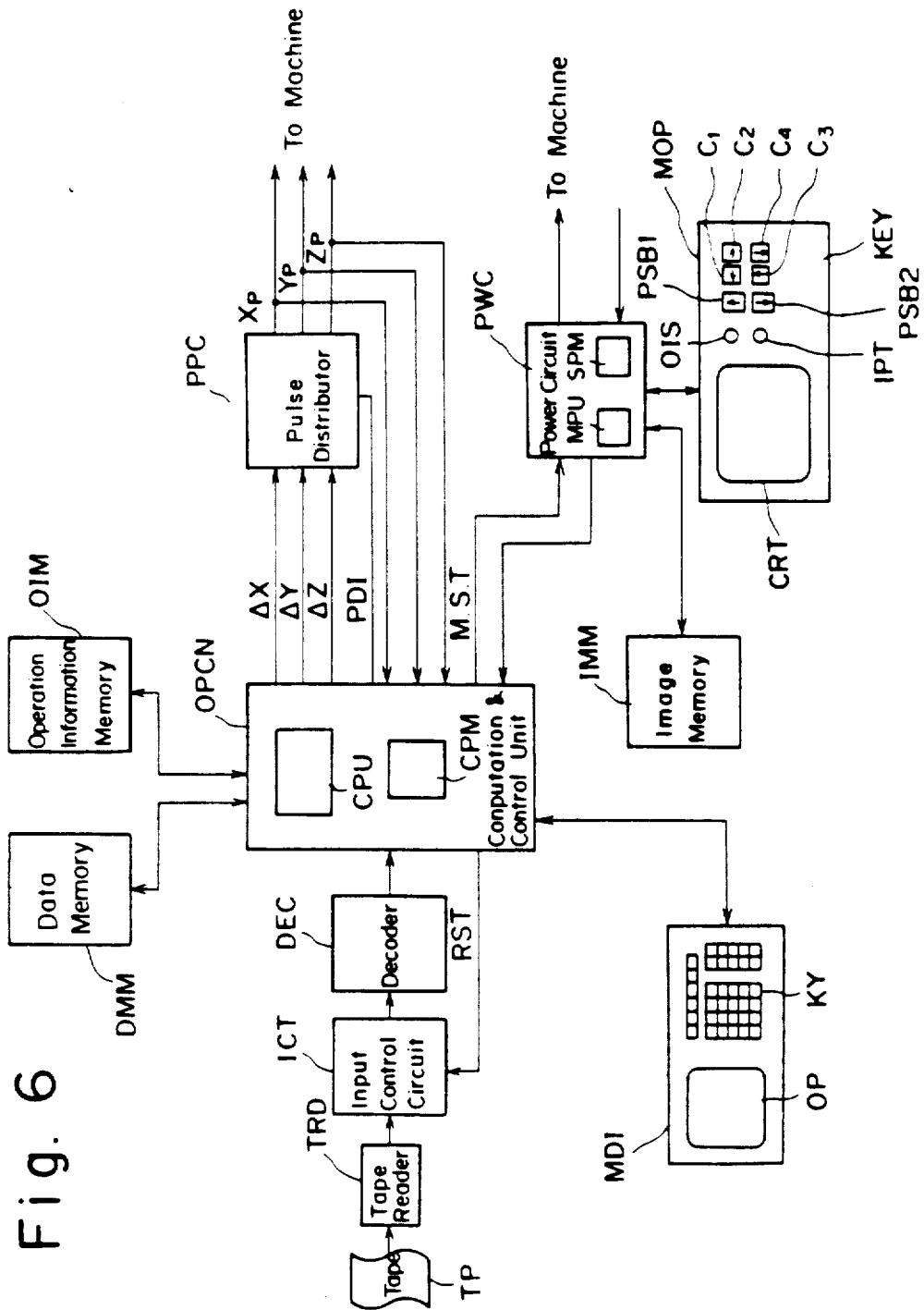
FIG. 6 is a block diagram of the hardware of the present invention.

FIG. 6 is a block diagram of the present invention. In FIG. 6, letters TP indicate an NC tape which is punched to have a pattern corresponding to an NC program containing a number of numerical control data (i.e., NC data). Letters TRD indicate a tape reader, and letters ICT indicate an input control circuit for controlling the tape reader TRD to sequentially read out the NC data from the NC tape TP and to input the data to a decoder at a later stage. Letters DEC indicate the decoder for decoding the read NC data, and outputting the data to a computation and control unit if the NC data is position instructions (Xe, Ye, Ze), a G function command or the like, or outputting the data to the machine through a power circuit at a later stage if the data is a M, S or T function command. Letters OPCN indicate a computation control circuit which comprising a central processing unit CPU, and a control program memory CPM and which executes predetermined numerical control processing on the basis of either the numerical control program data inputted from the NC tape TP or the operation information.

Letters PPC indicate a pulse distributor for outputting distributed pulses Xp, Yp and Zp to the machine in response to distribution instructions ΔX, ΔY and ΔZ from the computation control circuit OPCN. Letters PWC indicate the power circuit which includes a programmable controller to sequentially control the machine in accordance with an inputted function command and to execute operation information input processing to be described later. The programmable controller includes a processor MPU, and a memory SPM which stores a sequence program. Letters MOP indicate the machine operator's panel which is equipped with a display CRT, an operation information setting key OIS, an input key IPT, page switching buttons PSB1 and PSB2, and cursor keys C1 to C4. Letters IMM indicate an image memory for storing the operation information to be displayed on the display CRT. Letters MDI indicate a manual data input unit which is equipped with a display DP and a variety of keys KY for inputting NC instruction data to the computation control circuit OPCN by means of the various keys. The display DP, displays the contents of the data having the state of the computation control circuit OPCN as instructed by the keys, for example.

Letters OIM indicate a RAM (i.e., a memory for storing operation information) having a battery backup. The RAM stores the operation information which is input via the machine operator's panel by means of both the display CRT and the keys KY. Letters CMM indicate a data memory for storing the numerical control processing results or the like.

Next, the operation of the FIG. 6 system will be described in the following.

When operation information is to be inputted from the machine operator's panel, the operation information setting key OIS on the machine operator's panel MOP is first operated. This initiates the MPU processor's operation information input processing. Then, the page switching button PSB1 or PSB2 (e.g., the former for page increment and the latter for page decrement) is depressed. If this page switching button is continuously depressed, the processor MPU sequentially causes the CRT to display the images which are stored in the image memory IMM. Since the image memory IMM stores the operation information in a plurality of pages, the page switching button PSB1 or PSB2 is released when a desired operation information image is displayed. Then the cursor keys C1 to C4 are operated. As described above, the cursor is positioned in predetermined items of the respective selecting rows and setting rows, and then the input key IPT is depressed. Then, the operation information are selected inputted, and transferred, through the power circuit PWC, to the computation control circuit OPCN and stored in the operation information memory OIM. When all of the desired operation information is stored, the inputting of the operation information is ended.

After this, the computation control circuit OPCN executes a numeral control program in accordance with the operation information stored in the operation information memory OIM. The machine is thus numercially controlled through the pulse distributor PPC and the power circuit PWC.

Thus, in the system of the present invention, the operation information stored in the operation information memory OIM is displayed on a display, and the necessary operation information is selected from the displayed information by operating the cursor keys or a light pen. Then, a numerical control program can be executed by the computation control circuit in response to the thus inputted operation information. As a result, the conventional switches or buttons used for selecting operation information can be omitted from the operator's panel. The present invention thus simplifies the construction of and the production cost of an operator's panel.

According to the system of the present invention, moreover, the operation information can be easily displayed and changed in accordance with the function and type of the machine to be numerically controlled. As a result, it is possible to select and input all types of operation information. Moreover, it is unnecessary to manufacture an expensive decorative laminated sheet in accordance with the type of the machine as is required with conventional panels, and it is unnecessary to prepare switches matching the decorative laminated sheet. Also, with the present invention the layout and meaning of the switches can be changed without difficulty, permitting easy changes in the meaning and amount of operation information.

Although the present invention has been described in connection with one embodiment thereof, there can be made within the gist of the present invention a variety of modifications which should not be excluded from the scope of the present invention.

As has been described hereinbefore, in a machine operator's panel for numerical control of the present invention, the amount of operation information, as needed by various numeral control machines, is stored in a memory. This operation information is displayed so that desired information can be selected from the displayed operation information. As a result, arbitrary operation information can be selected using a single machine operator's panel without the necessity of designing or manufacturing many machine operator's panels in conformity with the various machines. Thus, a user of the numeral control system can numerically control many types of machines by merely preparing a machine operator's panel with common specifications. Especially a user which manufactures multiple types but a small number of machines can do so easily and inexpensively.

What we claim is:

1. A numerical controller for controlling an apparatus, comprising:
   computation and control means for receiving operation information and a numerical control program, and for controlling the apparatus in accordance with said operation information and said control program;
   image memory means for receiving, storing and providing display information;
   power circuit means for receiving said display information from said image memory, for receiving first control signals and second control signals, said first control signals corresponding to said display information, for providing a portion of said operation information to said computation and control means in accordance with said second control signals, and for controlling the apparatus in accordance with said portion of said operation information;
   input and display means for receiving manual inputs, for displaying said operation information in accordance with said first control signals, for providing said second control signals to said power circuit means such that said second control signals vary in accordance with said manual inputs.

2. A numerical controller according to claim 1, wherein said input and display means includes:
   CRT display means for displaying a cursor and said operation information in accordance with said display information;
   cursor control means for controlling the position of said cursor on said CRT display means in accordance with said manual inputs and for generating said second control signals in accordance with said manual inputs; and
   input means for generating said first control signals in accordance with said manual inputs.

* * * * *

UNITED STATES PATENT AND TRADEMARK OFFICE
CERTIFICATE OF CORRECTION

PATENT NO. : 4,723,207

DATED : Feb. 2, 1988

INVENTOR(S) : Isobe et al

It is certified that error appears in the above-identified patent and that said Letters Patent is hereby corrected as shown below:

```
Front page [57] lines 3 & 4, delete "desired".
                line 4, change "an" to --a desired--.
Col. 2, line 30, change "of" (2nd occurrence) to --for--.
Col. 3, line 6, change "denote" to --denotes--.
Col. 4, line 59, after "selected" insert --,--.
```

Signed and Sealed this

Fourteenth Day of June, 1988

Attest:

DONALD J. QUIGG

Attesting Officer

Commissioner of Patents and Trademarks